Figure 1:
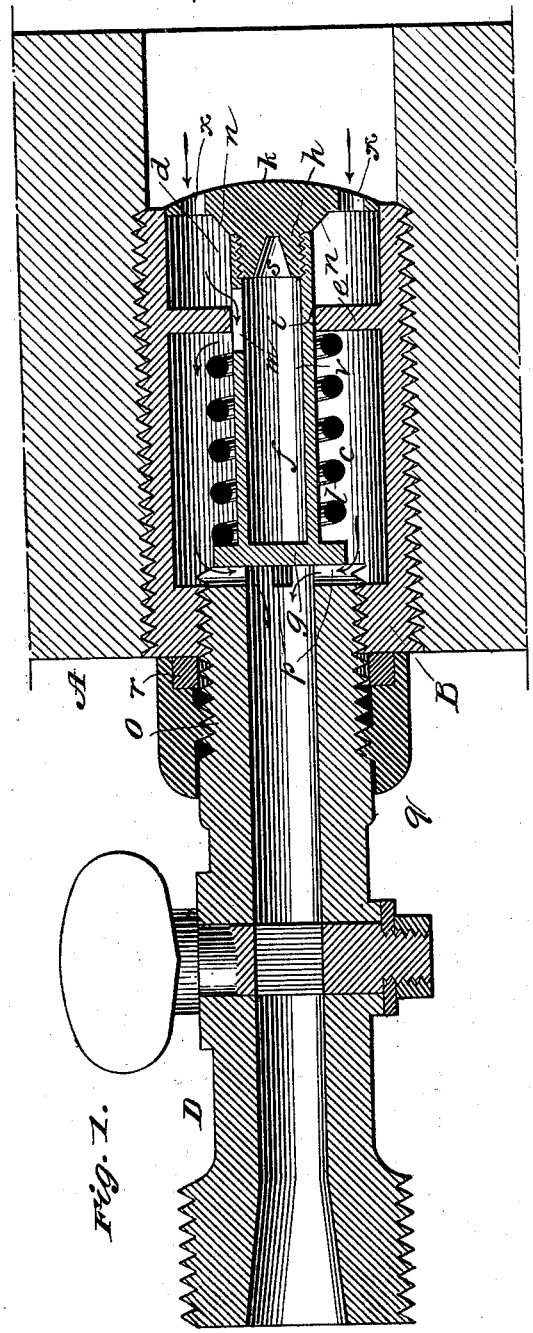

(No Model.) 2 Sheets—Sheet 1.

W. W. JACKSON.
BUSHING VALVE FOR BEER BARRELS.

No. 561,320. Patented June 2, 1896.

WITNESSES:
Frank S. Ober
Chas. E. Peters

INVENTOR
William W. Jackson
BY
ATTORNEY

ANDREW B.GRAHAM. PHOTO-LITHO. WASHINGTON, D.C.

(No Model.) 2 Sheets—Sheet 2.
W. W. JACKSON.
BUSHING VALVE FOR BEER BARRELS.
No. 561,320. Patented June 2, 1896.
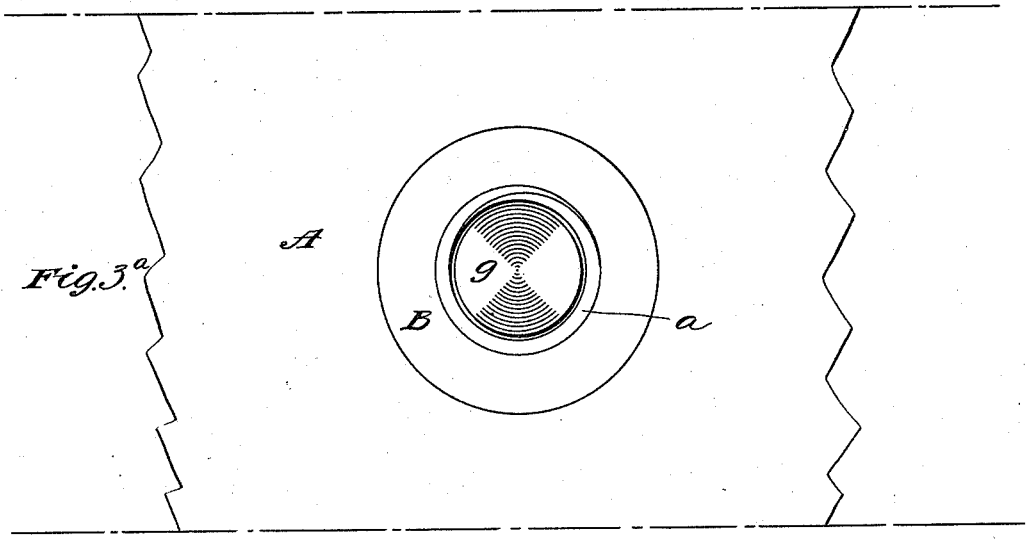
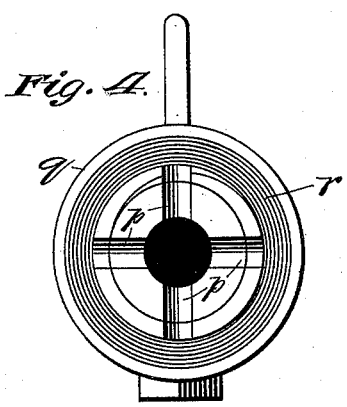
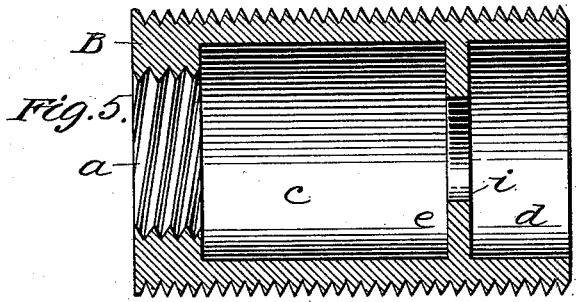
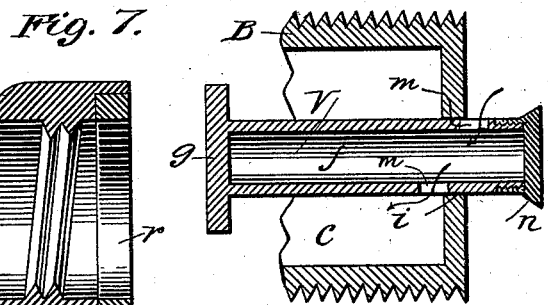
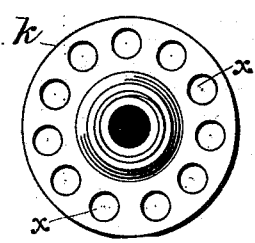
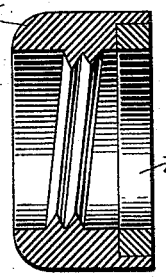
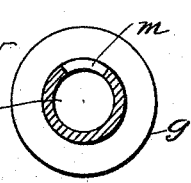
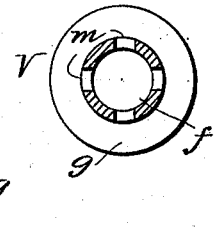
WITNESSES: INVENTOR
Frank S. Ober William W. Jackson
Chas E. Peters BY
 ATTORNEY

UNITED STATES PATENT OFFICE.

WILLIAM W. JACKSON, OF NEW YORK, N. Y., ASSIGNOR TO JOE LIVINGSTON AND ALBERT H. GROSS, OF SAME PLACE.

BUSHING-VALVE FOR BEER-BARRELS.

SPECIFICATION forming part of Letters Patent No. 561,320, dated June 2, 1896.

Application filed October 10, 1894. Renewed February 18, 1896. Serial No. 579,801. (No model.)

*To all whom it may concern:*

Be it known that I, WILLIAM W. JACKSON, a citizen of the United States, residing at New York, in the county of New York and State of New York, have invented certain new and useful Improvements in Bushing-Valves for Beer-Barrels, &c.; and I do hereby declare the following to be a full, clear, and exact description of the invention, such as will enable others skilled in the art to which it appertains to make and use the same.

This invention relates to devices for facilitating tapping and hermetically closing beer and ale barrels, casks, and other receptacles for liquors, &c., and it especially relates to that class of devices for the said purpose in which the tapping is done by the insertion of a pump coupling or faucet in a bushing, and which becomes hermetically closed on the withdrawal of the coupling or faucet from the bushing. The hitherto-known devices of this character are practically defective in many important particulars. For example, the construction of the bushing and movable valve leaves a space between their inner ends and the walls of the hole in the stave, in which mold and solid particles accumulate and remain, as the deposit cannot be reached and removed by any practicable mode of cleansing the barrel. The screen or straining-apertures being in the inner end of the bushing, the latter has to be made long enough to project through the stave to the inside of the barrel, and where very thick staves are used the bushing has to be made very long to extend through, thus increasing the cost of the device and interfering with the operation of pitching the barrel, the outer end of the valve being arranged to connect with the coupling or faucet when inserted in order to open the valve. The valve is very easily tampered with, and unauthorized persons by easily-obtainable means can readily open the valve without a coupling or faucet. Furthermore, as the outer end of the valve when closed is not flush with the outer end of the bushing a depression is left where dirt is apt to become deposited, fouling the bushing and delaying access to the valve, tempting unauthorized persons to tamper with the valve, and leaving the interior threads of the bushing exposed and liable to injury.

The object of my invention is to provide a device for tapping or hermetically closing beer or ale barrels, casks, &c., by the insertion or withdrawal of a pump coupling or faucet, which shall obviate the defects of the devices now in use, and to provide a bushing-valve in which the outer end of the bushing and the valve shall be guarded against the entrance and deposit of dirt, and the valve shall present no means by which it can be opened or tampered with by unauthorized parties, also to provide a bushing-valve that shall be adapted to be made of uniform length and applicable to any thickness of stave, and which shall be of the same diameter throughout, and arranged to fit the hole in the stave closely, leaving no space for the deposit of mold and other foreign substances, which cannot be tampered with, and which is adapted to close the outer end of the bore of the bushing and thereby prevent fouling or injury to the interior threads.

A further object of my invention is to construct a bushing-valve so that the inner end of the bore of the bushing shall be self-cleansing, and, finally, to operate a valve to open or close the exit through the bushing without making any positive connection between the coupling or faucet and the valve, and thereby provide a closing-plate for the outer end of the bushing which shall operate with the valve by means of a coupling or faucet, but present no place for the deposit of dirt or the connection of a device to open the valve by unauthorized persons.

To this end my invention consists of the following elements: first, in a solid disk or plate of substantially the same diameter as the screw-threaded outer bore of the bushing, which is connected with the valve and adapted when the valve is closed to enter the outer bore to a position flush with the face-plate of the bushing, thereby closing the outer end of the bushing, preventing access to the valve, and guarding the bore and valve against the entrance and deposit of dirt, and preventing injury to the screw-threads; second, in a valve for bushing-valves, constructed with an open stem, which is closed at the outer end by a solid plate, the open part of the stem being arranged so that when the valve is open the beer flows through the same into the bushing; third, in a self-cleansing bushing-valve constructed with a screen that fits perfectly the inner end of the bore of the bushing, and is operated by the valve, and which by constant use is adapted to keep the interior walls of the bushing bright and clean; fourth, in a bushing-valve having a bushing of the same diameter as the hole in the stave, so that no space is formed between the bushing and the walls of the hole; fifth, in a bushing-valve a tapered valve and a seat therefor formed by a square shoulder of the interior collar, in which the valve-guide works; sixth, in a bushing-valve constructed to admit the beer at the rear end only and thereby obviate the carrying of the bushing entirely through the stave; seventh, in a bushing-valve suitably constructed with a chamber at the rear end for the screen to operate in, whereby the beer is admitted to the rear end of the bushing only; eighth, in a bushing-valve a bushing constructed with a central chamber, a valve, and a hollow valve-stem provided with suitably-placed openings to furnish a passage for the beer around the valve-seat and into the said chamber; ninth, in combination with a bushing-valve a coupling or faucet having its screw-threaded rear end provided with radial slots or grooves, so that when screwed into the bushing and the valve thereby opened the said slots furnish a passage for the beer from the bushing-chamber into the coupling or faucet.

Figure 3:
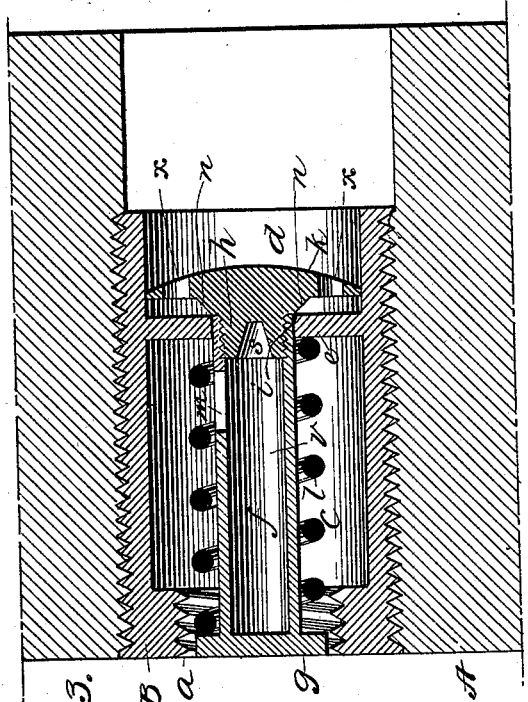
Figure 2:
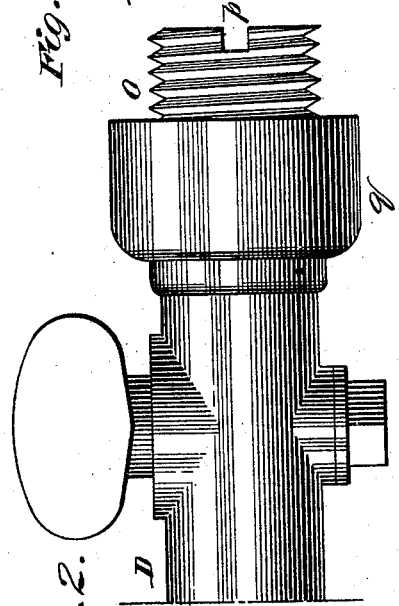

In the accompanying drawings, Figure 1 represents a longitudinal section of my improved bushing-valve with the coupling inserted and the valve open; Fig. 2, the coupling withdrawn from the bushing; Fig. 3, the bushing-valve after the withdrawal of the coupling, showing the valve closed; Fig. 3ª, a front view of the bushing-valve in the stave; Fig. 4, an end view of the coupling; Fig. 5, a longitudinal section of the bushing; Fig. 6, a view of the inside of the screen and valve-plug; Fig. 7, a section of the set-nut on the coupling; Fig. 8, a sectional view of a modification of the bushing and valve; Fig. 9, a transverse section of the modified valve; and Fig. 10 represents a further modification of the valve, showing a different arrangement of the apertures for the passage of the beer through the valve.

Referring to the drawings, A designates the main body or staves of a beer or ale barrel or cask, which may be of any thickness and is provided with a hole in which is screwed a cylindrical exteriorly-screw-threaded bushing B. This bushing need not extend through the stave to the interior of the barrel, as has been the case heretofore, but may terminate within the hole, as shown, and being cylindrical and of uniform diameter throughout its length it fits the hole tight, no space being left around its inner end for mold and foreign substances to deposit themselves. The bore of the bushing at the outer end is provided with screw-threads $a$, beyond which is an enlarged chamber $c$, and at the rear or inner end is another chamber $d$, separated from $c$ by a centrally-perforated partition or diaphragm $e$. The ends of chamber $c$ are squared against the screw-threaded bore of the bushing and at the partition $e$ at or near the opposite end.

The valve V is composed of a stem $f$, constructed at the outer end with a disk or plate $g$ of the same diameter as the screw-threaded bore, so as to move easily but in close contact with the walls of the bore, and at the opposite end with a tapered neck $n$, forming the air-tight closing part or valve-plug, which seats against the square shoulder $i$ of the partition $e$, and the said valve also carries a circular perforated screen $k$, that fits closely to the walls of the chamber $d$, so that when operating therein its edges working against the said walls keeps them bright and clean. The screen and tapered valve-plug are represented to be made in one piece; but it is obvious that they may be made separately, and they make a screw connection with the end of the stem, being provided with a screw-threaded stud $s$, which screws into the threaded end of the stem, as shown. A spring $l$ is coiled around the valve-stem and bears at the inner end against the partition $e$ and at the outer end against the plate $g$ and operates to keep the valve-plug on its seat and the plate $g$ at the front of the bore flush with the outer end of the bushing, as shown in Fig. 3.

In the valve-stem adjacent to the valve-plug is an opening $m$, placed at such distances or made of such length that when the valve is off its seat and the screen is at the extremity of the bushing the openings will communicate with both chambers $c$ $d$, thus furnishing a passage-way for the beer from the outer chamber to the inner when the coupling is attached or inserted in the bushing. The spring keeps the valve closed at both ends—that is, with the tapered plug against the seat $i$, making the valve air-tight at the inner end, and the plate $g$ in the screw-threaded bore and flush with the face or outer end of the bushing, thereby closing the exterior opening of the bushing and presenting a flat surface without depressions or projections.

The pump-coupling D has its rear end $o$, which enters the bushing, screw-threaded to adapt it to engage the screw-threaded bore of the bushing, and in the face of the end $o$ are radial slots, grooves, or channels $p$ $p$. The end of the body part of the faucet adjoining the end $o$ is also screw-threaded and is fitted with a set-nut $q$, having in the outer edge a groove in which is placed a packing-ring $r$, of rubber, Babbitt metal, or other suitable packing material. The purpose of this set-nut is to make a tight joint for the coupling when the latter will not screw in far enough to be brought to an upright position, in which case, after turning it as far as practicable, the set-nut is turned up against the end of the bushing and completes the making of the joint.

The operation of the invention is as follows: The normal position of the valve is shown in Fig. 3, where, it will be observed, the inner end rests on its seat $i$, forming an air-tight joint, and the outer end $g$ is in the bore of the bushing flush with the end thereof, so that in practice no aperture would be discoverable. The valve is held in this position by the spring $l$. Now when the barrel is to be tapped the screw-threaded end $o$ of the coupling (or faucet) is placed against the plate $g$ and pressed and turned until its threads engage the threads of the bore, and when the engagement is made the coupling is screwed in, forcing the valve back, the tapered part $n$ off its seat $i$, and moving the screen $k$ backward in the chamber $d$ and the plate $g$ back into the chamber $c$ until the end of the faucet with the grooves $p$ passes out of the threaded bore $a$ and into the bushing-chamber $c$, when, all the parts being in the position shown in Fig. 1, the beer flows through the apertures $x$ of the screen into the chamber $d$, thence through the perforation $m$ in the stem to pass the partition, and into the bushing-chamber $c$.

It will be observed that the opening $m$ in the stem is so placed that when the screen is at its extreme inner position, as in Fig. 1, it extends to both sides of the partition $e$. Hence when the beer flows from chamber $d$ it passes around the partition and into the bushing-chamber $c$ and thence through the passages $p$ into the main channel of the coupling and thence to the pump. The flowing of the beer from the barrel to the coupling is indicated by arrows.

To close the valve, the coupling is unscrewed, whereupon the spring forces the valve to follow and automatically closes it, the stem being moved outward until the opening passes the partition, as shown in Fig. 3, thus shutting off the passage of the beer from the chamber $d$, the screen is moved up toward the partition, the tapered part is caused to seat itself on the seat $i$, making an air-tight joint, and the plate $g$ enters the bore of the bushing, the valve thus automatically closing both ends of the bushing.

The constant operation of the valve moving the screen backward and forward in the chamber C, with its edges fitting perfectly against the walls of the inner end of the bushing, keeps them bright and clean, thereby preventing the fouling of the inner end of the bushing.

Many modifications of the devices constituting this invention will readily suggest themselves to one skilled in the art. Two such modifications are illustrated by Figs. 8 to 10. In these the rear chamber of the bushing is dispensed with, also the movable screen, and the valve terminates with the tapered part $n$, as shown in Fig. 8, the construction and operation being otherwise the same, except that two openings $m$ $m$ are made on opposite sides of the stem, the one nearer the end of the stem than the other, so that when the valve is opened one aperture will be outside of the end wall of the bushing (or the partition, as the case may be) and the other in the bushing-chamber $c$, as shown in Fig. 8. The apertures may also be round holes drilled in the stem, as in Fig. 10, arranged so that some will be to the rear of the wall or partition and others in the bushing-chamber $c$ when the valve is opened.

The stem fits the hole in the partition or end wall of the bushing perfectly, so as to serve as a guide for the valve that will prevent it from twisting when the valve is operated.

I claim—

1. A bushing-valve constructed with a bushing having an exteriorly-screw-threaded bore, an interior valve-opening, and a valve comprising a stem which fits the said valve-opening closely, and is provided with an opening (or openings) for the passage of the beer into the bushing, a valve-plug on its inner end to close the said valve-opening, and a solid smooth-faced plate on its outer end that stops the entrance to the bore and protects the screw-threads thereof when moved by the closing of the valve to the outer end of the bore flush with the end of the bushing, substantially as specified.

2. In a bushing-valve a valve comprising a valve-plug and a closing-plate for the outer end of the bushing and provided with a stem open in the sides and closed at the ends whereby when the valve is opened the beer is admitted into the bushing through the open stem, substantially as specified.

3. A bushing-valve constructed with a bushing having an inner end chamber and a middle chamber, a perforated screen and valve-plug in the inner end chamber, the screen fitted accurately to and working against the walls of the chamber when the valve is opened or closed, a solid closing disk or plate fitted accurately but operatively in the screw-threaded outer bore of the bushing, the screen valve-plug and closing-plate connected together by a stem provided with suitable openings adjacent to the valve-plug that partly pass the valve-seat when the valve is opened and thereby form a channel for the passage of the beer into the middle chamber of the bushing, substantially as specified.

4. A bushing-valve constructed with an integral chambered bushing adapted to receive a faucet, a valve-plug to close its inner end, a solid disk or plate to close its outer end, and a stem which connects the valve-plug and solid plate, and is provided with an opening adjacent to the valve-plug which partly passes the valve-seat when the valve is opened and thereby forms a channel for the passage of the beer from the keg to the bushing-chamber, substantially as specified.

5. In a bushing-valve the combination of an integral chambered bushing having its inner and outer ends provided respectively with a valve-opening and a screw-threaded bore to receive a faucet, a self-closing valve composed of a stem positioned wholly within the valve-opening and bushing-chamber, a valve-plug fitted to the inner end of the stem, and a disk or plate fitted to the outer end of the stem in line with the screw-threaded bore of the bushing, and the said stem provided with openings which when the valve is opened partly pass the valve-seat, thereby forming a channel for the passage of the beer from the keg to the inner chamber of the bushing and thence to the faucet, substantially as specified.

6. A bushing-valve in which the bushing is constructed with a chamber at the rear end and unperforated walls, a reciprocally-movable screen fitted perfectly in the said chamber and operated by the valve, whereby the beer is caused to flow directly into the rear end of the bushing through the movable screen, substantially as specified.

7. In a bushing-valve the combination of an integral chambered bushing having its inner and outer ends provided respectively with a valve-opening and a screw-threaded bore, a self-closing valve composed of a stem positioned in the bushing-chamber with its inner end in the valve-opening in the wall or partition of the bushing, a valve-plug fitted to the inner end of the said stem, a solid disk or plate fitted to the outer end of the said stem in line with the screw-threaded bore, the said stem provided with openings which partly pass the valve-seat when the valve is opened thereby forming channels for the passage of the beer from the keg to the inner chamber of the bushing, and a faucet or coupling having its screw-threaded coupling end radially grooved whereby when screwed into the outer bore of the bushing its grooved end presses against the solid disk or plate, and when it passes the inner end walls of the screw-threaded bore the said grooves form channels for the passage of the beer from the inner chamber of the bushing into the coupling or faucet, substantially as specified.

8. In a bushing-valve, the combination of an integral chambered bushing having its inner and outer ends provided respectively with a valve-opening and a reduced screw-threaded bore the inner ends of the walls of said bore forming a shoulder and one end of the bushing-chamber, a self-closing valve composed of a stem positioned in the valve-opening and the bushing-chamber, a valve-plug on the inner end of the stem and a solid disk or plate on its outer end in line with the screw-threaded bore, the said stem having openings which partly pass the valve-seat when the valve is opened, and a faucet or coupling having its screw-threaded coupling end radially grooved, whereby when screwed into the outer bore of the bushing the grooved end of the faucet bears against the solid plate of the valve and forces it back thereby opening the valve, and when the plate and grooved end pass the inner end of the screw-threaded bore, the grooves open into the bushing-chamber and the beer in the chamber is permitted to flow through said grooves, between the end of the faucet and the solid plate, and enter the faucet, substantially as specified.

9. In a bushing-valve, an exteriorly-screw-threaded bushing open at both ends to permit a direct flow to the faucet or coupling at the outer end of the bushing, and of uniform diameter from the face-plate to its inner extremity to adapt it to fit closely the hole in the stave, and having a central chamber between the inner perforated end wall or partition and the walls of the outer screw-threaded bore, in combination with a self-closing valve composed of a valve-plug to close the perforation in the inner end wall or partition, a solid disk or plate to close the outer screw-threaded bore, and a stem connecting the said valve-plug and disk or plate and provided with an opening adjacent to the valve-plug which when the valve is opened partly passes the valve-opening and thereby forms a channel for the passage of the beer into the bushing-chamber, substantially as specified.

10. In a bushing-valve the combination of an integral chambered bushing B open at both ends and provided at its outer end with a screw-threaded bore for the attachment of a faucet and at its inner end with a centrally-perforated wall or partition $e$, a self-closing valve V composed of a stem $f$ having at its outer end a solid disk or plate $g$, fitted accurately but operatively to the bore, and at its inner end a valve-plug $n$, and provided with an opening which when the valve is opened, partly passes the valve-opening, the said stem positioned in the central chamber of the bushing with its end which carries the valve-plug in the valve-opening and the plate $g$ in the screw-threaded bore, substantially as specified.

11. In a bushing-valve, the combination of a chambered bushing B having a screw-threaded bore, an inner end chamber $d$ and a middle chamber $c$ separated from each other by a perforated wall or partition $e$, a self-closing valve V, composed of a stem $f$ carrying at its outer end in the screw-threaded bore, a solid disk or plate $g$, and at its inner end, which projects into the perforation in the wall or partition $e$, a valve-plug, said stem provided with an opening $m$, which when the valve is opened, partly passes the valve-opening, and a perforated screen $k$, also carried by the stem $f$, in the chamber $d$ and fitting accurately the walls of the said chamber, substantially as specified.

12. A bushing-valve, constructed with a bushing having an inner end chamber, a middle chamber, a suitable valve, and a perforated screen connected with the valve, the edges of the said screen fitted accurately to the walls of the inner chamber and the perforations arranged in lines parallel to the axis of the bushing whereby the beer is caused to enter the bushing directly, substantially as specified.

In testimony that I claim the invention above set forth I affix my signature in presence of two witnesses.

WILLIAM W. JACKSON.

Witnesses:
FREDK. HAYNES,
MILTON C. DONN.